United States Patent
Yoshitomi

(12) 
(10) Patent No.: US 9,045,580 B2
(45) Date of Patent: Jun. 2, 2015

(54) POLYURETHANE FOAM FOR SEAT PAD

(75) Inventor: Kosuke Yoshitomi, Kanagawa (JP)

(73) Assignee: BRIDGESTONE CORPORATION, Tokyo (JP)

(*) Notice: Subject to any disclaimer, the term of this patent is extended or adjusted under 35 U.S.C. 154(b) by 246 days.

(21) Appl. No.: 13/641,815

(22) PCT Filed: Apr. 18, 2011

(86) PCT No.: PCT/JP2011/059555
§ 371 (c)(1),
(2), (4) Date: Nov. 28, 2012

(87) PCT Pub. No.: WO2011/132645
PCT Pub. Date: Oct. 27, 2011

(65) Prior Publication Data
US 2013/0065980 A1    Mar. 14, 2013

(30) Foreign Application Priority Data
Apr. 19, 2010  (JP) ................. 2010-096077

(51) Int. Cl.
| | |
|---|---|
| C08G 18/00 | (2006.01) |
| C08G 18/32 | (2006.01) |
| B60N 2/70 | (2006.01) |
| B29C 44/02 | (2006.01) |
| C08G 18/48 | (2006.01) |
| C08G 18/72 | (2006.01) |
| C08G 59/00 | (2006.01) |
| C08G 101/00 | (2006.01) |

(52) U.S. Cl.
CPC ........ *C08G 18/3203* (2013.01); *B60N 2/7017* (2013.01); *B29C 44/02* (2013.01); *C08G 18/4833* (2013.01); *C08G 18/4837* (2013.01); *C08G 18/721* (2013.01); *C08G 18/4816* (2013.01); *C08G 2101/0083* (2013.01)

(58) Field of Classification Search
CPC ................. C08G 18/10; C08G 18/12

USPC ........ 264/54; 521/174; 528/44, 49, 59, 68, 90
See application file for complete search history.

(56) References Cited

U.S. PATENT DOCUMENTS 6,653,362 B2 * 11/2003 Toyota et al. ................. 521/174
2009/0062416 A1   3/2009 Sasaki et al.

FOREIGN PATENT DOCUMENTS

| JP | 8-176258 A | 7/1996 |
|---|---|---|
| JP | 2003-221427 A | 8/2003 |
| JP | 2004-167233 A | 6/2004 |
| JP | 2005-290202 A | 10/2005 |
| JP | 2007-56254 A | 3/2007 |
| JP | 2007-145983 A | 6/2007 |
| JP | 2008-127514 A | 6/2008 |
| JP | 2009-155562 A | 7/2009 |
| JP | 2009155562 | * 7/2009 |
| JP | 2010-195943 A | 9/2010 |
| JP | 2010-260928 A | 11/2010 |
| WO | 2007/099995 A1 | 9/2007 |

OTHER PUBLICATIONS

International Search Report for PCT/JP2011/059555 dated Jul. 12, 2011.

* cited by examiner

*Primary Examiner* — Terressa Boykin
(74) *Attorney, Agent, or Firm* — Sughrue Mion, PLLC

(57) ABSTRACT

A foam-molded polyurethane foam for a seat pad, particularly for a vehicle, that reduces both shakiness and stress relaxation is provided. The polyurethane foam contains a foaming liquid containing (A) a polyol, (B) a polyisocyanate, (C) water and (D) a catalyst. The polyol (A) contains from 40 to 50% by mass of (a-1) a polyether polyol having a molar ratio of repeating units derived from ethylene oxide and propylene oxide of from 5/95 to 25/75 and a number average molecular weight of from 6,000 to 8,000, and from 5 to 15% by mass of (a-2) a polyether polyol having a molar ratio of repeating units derived from ethylene oxide and propylene oxide of from 0/100 to 20/80 and a number average molecular weight of from 600 to 2,000. The amount of water (C) is 2.0 parts by mass or more per 100 parts by mass of the polyol (A).

6 Claims, 1 Drawing Sheet

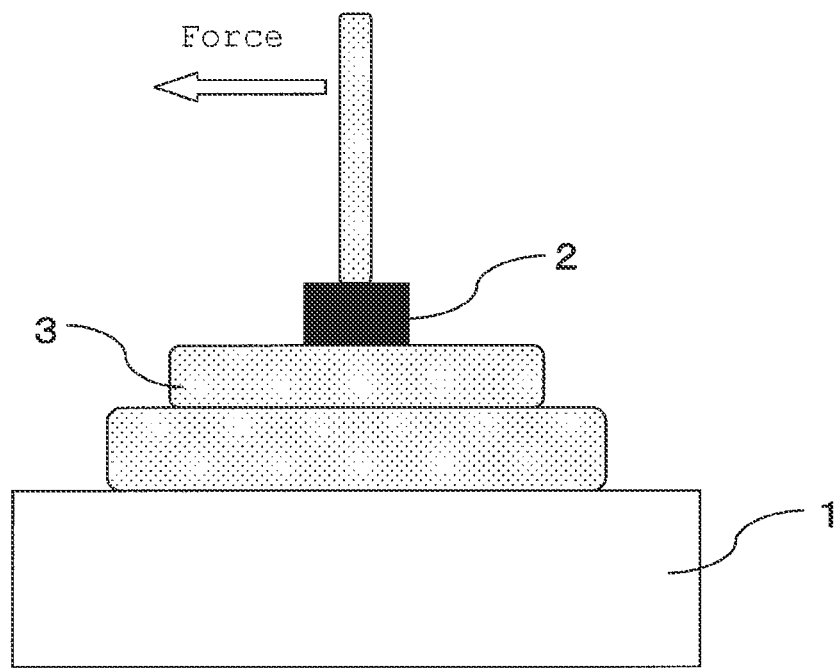

POLYURETHANE FOAM FOR SEAT PAD

CROSS REFERENCE TO RELATED APPLICATIONS

This application is a National Stage of International Application No. PCT/JP2011/059555 filed Apr. 18, 2011, claiming priority based on Japanese Patent Application No. 2010-096077 filed Apr. 19, 2010, the contents of all of which are incorporated herein by reference in their entirety.

TECHNICAL FIELD

The present invention relates to polyurethane foam for a seat pad, and more specifically relates to polyurethane foam for a seat pad that achieves both reduced shakiness and reduced stress relaxation and is suitable particularly for a vehicle seat pad.

BACKGROUND ART

Polyurethane foam is demanded to have various mechanical characteristics including heat insulating property, vibration absorbing characteristics and the like depending on purposes, and particularly in a vehicle seat pad and the like, comfort, such as comfort to sit and high repulsive elasticity, is demanded. For aiming enhancement of the comfort, the structure of the main component of the polyurethane foaming raw material and the subsidiary raw material therefor, such as a filler, have been reconsidered for enhancing the vibration absorbing characteristics around 6 Hz (ca. from 4 to 8 Hz), which is ordinarily said to be the resonance point with the internal organs of human body, and such attempts have been made for decreasing the resonance frequency and the resonance magnification of the resulting polyurethane foam. For decreasing the resonance frequency and the resonance magnification, it has been effective that the density is increased, and the weight is increased.

A vehicle seat pad may often suffer such a problem that the seat fails to support the human body due to the centrifugal force applied to the body on changing lanes or driving a curve, thus shaking the body. For reducing the shakiness, such measures have been made that (1) the molecular weight of polyether polyol used as a raw material of polyurethane foam is changed from a high molecular weight to a low molecular weight, (2) the proportion of the ethylene oxide unit in the repeating units derived from ethylene oxide and propylene oxide in the polyether polyol is increased, (3) the water content in the foaming liquid for forming polyurethane foam is increased, and (4) the amount of the crosslinking agent is increased.

On taking the measures, however, there may be a problem that the resulting polyurethane foam is lowered in repulsive elasticity and air permeability, and the stress relaxation, which is important in ride comfort, is deteriorated (increased). That is, there is a trade-off between the shakiness and the stress relaxation, i.e., when the shakiness is improved (lowered), the stress relaxation is deteriorated (increased), and when the stress relaxation is improved, the shakiness is deteriorated.

A vehicle is demanded to be enhanced in fuel efficiency due to increase of consciousness on environmental loading reduction in recent years, and as part thereof, the constitutional parts have been reduced in weight. The attempts of weight reduction is extended to all the constitutional parts including the exterior and interior of the vehicle, and also to a seat pad. However, when the density of the foamed material is decreased, there may be such a problem that the vibration absorbing characteristics, which influence the comfort, are deteriorated, and thus it is difficult to achieve both the density reduction and the vibration absorbing characteristics. Accordingly, in view of the needs including the ride comfort and the enhancement of fuel efficiency, such a seat and a cushioning material are demanded that have light weight and suitable repulsive force and vibration absorbing characteristics.

According to the demands, the present inventors propose polyurethane foam containing a polyurethane foaming liquid containing a polyol component and an isocyanate component as main components, having been foam-molded, in which the polyol used is a polyether polyol having a molecular weight of from 3,000 to 12,000, an unsaturation degree of 0.03 mEq/g or less and a ratio, molecular weight/number of functional group, of from 1,000 to 3,000, and an organized inorganic filler is mixed therein (see Patent Document 1). The polyurethane foam proposed therein has lightweight and is excellent in vibration absorbing characteristics.

RELATED ART DOCUMENT

Patent Document

Patent Document 1
JP-A-2008-127514

Problems to be Solved by the Invention

The polyurethane foam disclosed in Patent Document 1 has excellent vibration characteristics, e.g., a resonance frequency of 4 Hz or less and a resonance magnification of 3 or less, but in the case where it is used as a vehicle seat pad, the seat pad may be shaken on driving a curve in some cases. When the shakiness is large, it may be expected that the human body may largely lean on application centrifugal acceleration on driving a curve.

The present invention has been made under the circumstances, and an object thereof is to provide polyurethane foam for a seat pad that achieves both reduced shakiness and reduced stress relaxation, is suitable particularly for a vehicle seat pad, has good ride comfort, and is free of problem in shakiness.

Means for Solving the Problems

As a result of earnest investigations made by the present inventors, it has been found that the problems may be solved in such a manner that in polyurethane foam containing a foaming liquid containing a polyol component, a polyisocyanate component, water and a catalyst, which has been foam-molded, the polyol component contains a high molecular weight polyether polyol and a low molecular weight polyether polyol in a particular ratio, and contains a particular amount of water, and furthermore, timed pressure release (which may be hereinafter referred to as "TPR") is utilized as a molding method. The present invention has been made based on the knowledge.

The present invention thus provides the following.

(1) Polyurethane foam for a seat pad, containing a foaming liquid containing (A) a polyol component, (B) a polyisocyanate component, (C) water and (D) a catalyst, which has been foam-molded, wherein the polyol component (A) contains from 40 to 55% by mass, based on the polyol component, of (a-1) a polyether polyol, which is obtained through ring-opening polymerization of ethylene oxide and propylene oxide, having a molar ratio of repeating units derived from ethylene oxide and propylene oxide of from 5/95 to 25/75 and a number average molecular weight of from 6,000 to 8,000, and containing from 5 to 15% by mass, based on the polyol component, of (a-2) a polyether polyol, which is obtained through ring-opening polymerization of propylene oxide solely or ethylene oxide and propylene oxide, having a molar ratio of repeating units derived from ethylene oxide and propylene oxide of from 0/100 to 20/80 and a number average molecular weight of from 600 to 2,000, and an amount of water (C) contained is 2.0 parts by mass or more per 100 parts by mass of the polyol component (A).

(2) The polyurethane foam for a seat pad according to the item (1), wherein the polyisocyanate component (B) contains tolylene diisocyanate and/or diphenylmethane diisocyanate.

(3) The polyurethane foam for a seat pad according to the item (1) or (2), wherein the foaming liquid contains the polyisocyanate component (B) to make a molar ratio of an isocyanate group in the polyisocyanate component and an active hydrogen group in the foaming liquid of from 60/100 to 120/100.

(4) The polyurethane foam for a seat pad according to any one of the items (1) to (3), which further contains (E) a foam stabilizer and/or (F) a crosslinking agent.

(5) The polyurethane foam for a seat pad according to any one of the items (1) to (4), which is obtained through foam molding containing the steps of: feeding the foaming liquid into a cavity formed in a mold; and after a lapse of from 20 to 50 seconds from a gel time, reducing a pressure in the mold by from 0.15 to 0.25 MPa.

Advantages of the Invention

According to the present invention, polyurethane foam for a seat pad is provided that achieves both reduced shakiness and reduced stress relaxation, is suitable particularly for a vehicle seat pad, has good ride comfort, and is free of problem in shakiness.

BRIEF DESCRIPTION OF THE DRAWING

FIG. 1 is a schematic illustration showing an apparatus for measuring seat pads obtained in Examples and Comparative Examples for shaking angle.

EMBODIMENTS FOR CARRYING OUT THE INVENTION

The polyurethane foam for a seat pad (which may be hereinafter referred simply to "urethane foam" in some cases) of the present invention contains a foaming liquid containing (A) a polyol component, (B) a polyisocyanate component, (C) water and (D) a catalyst, which has been foam-molded. The components each will be described in detail below.

<(A) Polyol Component>

In the foaming liquid, the polyol component used as the component (A) contains a combination of (a-1) a high molecular weight polyether polyol and (a-2) a low molecular weight polyether polyol described below.

((a-1) High Molecular Weight Polyether Polyol)

The high molecular weight polyether polyol (a-1) is a polyether polyol that is obtained through ring-opening polymerization of ethylene oxide (which is hereinafter referred to as "EO") and propylene oxide (which is hereinafter referred to as "PO"), in which the molar ratio of repeating units derived from ethylene oxide and propylene oxide (EO/PO) is from 5/95 to 25/75, and the number average molecular weight is from 6,000 to 8,000. The high molecular weight polyether polyol may be used solely as a single kind thereof or as a combination of two or more kinds thereof.

The molar ratio of EO and PO is necessarily 5/95 to 25/75 as described above, and is preferably from 8/92 to 25/75, and more preferably from 10/90 to 20/80.

The number average molecular weight is necessarily in a range of from 6,000 to 8,000. When the number average molecular weight of the polyether polyol is less than 6,000, the repulsive elasticity may be lowered, and when it exceeds 8,000, the shakiness may not be avoided. In this point of view, the number average molecular weight is preferably in a range of from 7,000 to 8,000.

The number of hydroxyl groups contained in one molecule of the high molecular weight polyether polyol that is preferably used in the present invention is generally preferably from 2 to 4, and more preferably 3. When the number of hydroxyl groups is 4 or less, the viscosity of the raw material may not be increased.

The high molecular weight polyether polyol used preferably has a small unsaturation degree. More specifically, the unsaturation degree is generally preferably 0.03 mEq/g or less. When the unsaturation degree of the high molecular weight polyether polyol is 0.03 mEq/g or less, the durability and the hardness of the polyurethane foam of the present invention may not be impaired. The "unsaturation degree" referred in the present invention means a total unsaturation degree (mEq/g) measured by a method, in which mercuric acetate is reacted with the unsaturated bonds in the specimen, and acetic acid thus isolated is titrated with potassium hydroxide, according to JIS K1557-1970.

((a-2) Low Molecular Weight Polyether Polyol)

The low molecular weight polyether polyol (a-2) is a polyether polyol that is obtained through ring-opening polymerization of PO solely or EO and PO, in which the molar ratio of repeating units derived from EO and PO is from 0/100 to 20/80, and the number average molecular weight is from 600 to 2,000. The low molecular weight polyether polyol may be used solely as a single kind or as a combination of two or more kinds thereof. When the molar ratio is outside the range, i.e., exceeds 20/80, the air permeability may become too large to increase the shakiness, and thus the object of the present invention may not be achieved. The molar ratio is preferably from 0/100 to 10/90, and more preferably from 0/100 to 5/95.

When the number average molecular weight of the low molecular weight polyether polyol is less than 600, the stress relaxation may be increased, and thus the object of the present invention may not be achieved, and when it exceeds 2,000, the shakiness may be increased, and thus the object of the present invention may not be achieved. The number average molecular weight of the low molecular weight polyether polyol is preferably from 650 to 1,500, and more preferably from 700 to 1,200.

The number average molecular weight in the present invention is a value calculated as a polystyrene conversion value by a gel permeation chromatography (GPC) method.

The number of hydroxyl groups contained in one molecule of the low molecular weight polyether polyol that is preferably used in the present invention is generally preferably from 2 to 4, and particularly preferably 3, as similar to the high molecular weight polyether polyol described above. When the number of hydroxyl groups is too large, the viscosity of the raw material may be increased in some cases, and when it is too small, the properties may be deteriorated in some cases.

As the polyether polyol, one having a small unsaturation degree is preferably used, as similar to the high molecular weight polyether polyol. More specifically, the unsaturation degree is generally preferably 0.03 mEq/g or less. When the unsaturation degree of the low molecular weight polyether polyol is 0.03 mEq/g or less, the durability and the hardness of the polyurethane foam of the present invention may not be impaired.

The amounts of the high molecular weight polyether polyol (a-1) and the low molecular weight polyether polyol (a-2) contained in the polyol component (A) are from 40 to 55% by mass for the component (a-1) and from 5 to 15% by mass for the component (a-2), from the standpoint of achieving both reduced shakiness and reduced stress relaxation.

In the present invention, a polymer polyol may be used in combination with the polyether polyols (i.e., the component (a-1) and the component (a-2)) as the polyol component (A). As the polymer polyol, a versatile polymer polyol for a polyurethane foam-molded article may be used. Specific examples thereof include a polymer polyol obtained by graft-copolymerizing a polymer component, such as polyacrylonitrile and an acrylonitrile-styrene copolymer, with a polyether polyol formed of a polyalkylene oxide, preferably having a number average molecular weight of from 3,000 to 8,000, and more preferably from 4,000 to 7,000. The alkylene oxide as a raw material of the polyalkylene oxide preferably contains propylene oxide, and particularly preferably contains propylene oxide solely or contains both propylene oxide and ethylene oxide. The proportion of the polymer component in the polymer polyol is generally from 30 to 55% by mass.

In the case where a mixture of the polyether polyols (i.e., the component (a-1) and the component (a-2)) and the polymer polyol is used as the component (A), the mixing ratio thereof, (polyether polyols)/(polymer polyol) (mass ratio), is generally from 30/70 to 100/0, and preferably from 40/60 to 80/20. When the mixing ratio thereof deviates from the range, the properties may be deteriorated, and failure may occur on reaction, in some cases.

The polyol component (A) in the present invention preferably has a viscosity (in the case where a mixture of plural kinds of polyols is used as the component (A), a viscosity of the mixed polyol as a whole) of 3,000 mPa·s or less, and particularly 1,800 mPa·s or less, at a liquid temperature of 25° C. The use of polyol component having a viscosity in the range can suppress the viscosity increasing rate of the polyurethane foaming liquid to enhance the agitation efficiency, and thus the isocyanate groups and the hydroxyl groups can be reacted more uniformly. Accordingly, not only the generation efficiency of the gas thus generated is enhanced as compared to an ordinary one, but also the gas is generated from the generation sites that are uniformly distributed in the polyurethane foaming liquid, thereby providing a light-weight and uniform polyurethane foam-molded article. In the present invention, the viscosity means a viscosity measured with a capillary viscometer at a liquid temperature of 25° C. according to JIS Z8803-1991.

<(B) Polyisocyanate Component>

The polyisocyanate component used as the component (B) in the foaming liquid may be known various polyfunctional aliphatic, alicyclic and aromatic isocyanates. Examples thereof include tolylene diisocyanate (TDI), diphenylmethane diisocyanate (MDI), dicyclohexylmethane diisocyanate, triphenyl diisocyanate, xylene diisocyanate, polymethylene polyphenylene polyisocyanate, hexamethylene diisocyanate, isophorone diisocyanate, o-toluidine diisocyanate, naphthylene diisocyanate, xylylene diisocyanate and lysine diisocyanate, which may be used solely as a single kind thereof or as a combination of two or more kinds thereof.

In the present invention, tolylene diisocyanate (TDI) and/or diphenylmethane diisocyanate (MDI) are preferably contained from the standpoint of the molding density range.

The content of the polyisocyanate as the component (B) in the foaming liquid is not particularly limited, and the content is desirably selected such that the molar ratio of the isocyanate group in the polyisocyanate component and the active hydrogen group in the foaming liquid is preferably from 60/100 to 120/100, and more preferably from 70/100 to 115/100, for providing a favorable foaming state without occurrence of agitation failure.

<(C) Water>

In the foaming liquid, water is used as a foaming agent as the component (C). Water is reacted with the polyisocyanate to form carbon dioxide gas, and thus functions as a foaming agent.

The amount of water mixed is necessarily 2.0 parts by mass or more per 100 parts by mass of the polyol component (A). When the amount of water mixed is less than 2.0 parts by mass, sufficient advantage of suppressing shakiness may not be obtained. The upper limit of the amount of water is not particularly limited, as far as the advantages of the present invention are exhibited, and is preferably 10 parts by mass or less, more preferably 7 parts by mass or less, and further preferably 4 parts by mass or less, per 100 parts by mass of the polyol component.

<(D) Catalyst>

The foaming liquid contains a catalyst as the component (D) from the standpoint of the reactivity on foam-molding. The catalyst used may be a versatile one in the production of polyurethane foam, and one kind or a combination of two or more kinds thereof may be used depending on purposes and demands. Specific examples thereof include an amine catalyst, such as tetramethylhexamethylenediamine, pentamethyldiethylenetriamine, dimethylcyclohexylamine, bis(dimethylaminoethyl)ether, tetramethylpropylenediamine, trimethylaminoethylpiperazine, tetramethylethylenediamine, dimethylbenzylamine, methylmorpholine, ethylmorpholine, triethylenediamine and diethanolamine, and a tin catalyst, such as stannous octate and dibutyltin laurate. Commercially available products may be used as the catalyst as the component (D), and preferred examples thereof include triethylenediamine (TEDA-L33, produced by Tosoh Corporation) and bis(dimethylaminoethyl)ether (TOYOCAT-ET, produced by Tosoh Corporation).

The amount of the component (D) mixed in the foaming liquid is preferably from 0.05 to 0.5 part by mass, more preferably from 0.1 to 5 parts by mass, further preferably from 0.1 to 3 parts by mass, and particularly preferably from 0.1 to 1 part by mass, per 100 parts by mass of the polyol as the component (A).

<Optional Components>

The foaming liquid may contain, as optional components, (E) a foam stabilizer and/or (F) a crosslinking agent. Furthermore, various additives may be contained depending on necessity, and for example, a colorant, such as a pigment, a chain extender, a filler, such as calcium carbonate, a flame retardant, an antioxidant, an ultraviolet ray absorbent, a light stabilizer, an electroconductive substance, such as carbon black, and an antimicrobial agent may be contained. In this case, the contents of the additives may be ones that are ordinarily used.

((E) Foam Stabilizer)

The foam stabilizer used as the component (E) may be a versatile one for a polyurethane foam-molded article, and for example, a silicone foam stabilizer, such as a siloxane-polyether block copolymer, may be used.

The amount of the foam stabilizer contained in the polyurethane foaming liquid is generally from 0.3 to 5 parts by mass, and preferably from 0.3 to 3 parts by mass, per 100 parts by mass of the polyol as the component (A). When the amount is 0.3 part by mass or more, favorable agitation property may be obtained for the polyol component and the isocyanate component, thereby facilitating production of desired urethane foam.

((F) Crosslinking Agent)

The crosslinking agent as the component (F) may be a versatile one for a polyurethane foam-molded article.

The amount of the crosslinking agent in the polyurethane foaming liquid is generally preferably from 0.5 to 10 parts by mass per 100 parts by mass of the polyol as the component (A). When the amount is 0.5 part by mass or more, the advantage of the crosslinking agent is sufficiently obtained, and when it is 10 parts by mass or less, suitable closed-cell forming property may be obtained, which ensures the molding property and prevents foam down from occurring.

<Preparation of Foaming Liquid>

The preparation method of the foaming liquid in the present invention is not particularly limited, and a mixture of all the components except for the component (B) (which may be hereinafter abbreviated as a polyol mixture in some cases) may be prepared, which may be then mixed with the component (B).

The preparation of the polyol mixture is preferably performed, from the standpoint of preventing contact between water and a catalyst as much as possible, in such a manner that the catalyst (D) is mixed with the polyol component (A), then the other components including the foam stabilizer (E) and the crosslinking agent (F) are mixed therewith, and finally the water (C) as a foaming component is mixed therewith.

In the present invention, the polyol mixture preferably has a viscosity of 2,400 mPa·s or less at a liquid temperature of 25° C. This is because the agitation efficiency of the polyurethane foaming liquid may be improved, thereby providing a desired polyurethane foam-molded article with sufficient and uniform foaming. In this point of view, the viscosity of the polyol mixture is preferably 1,800 mPa·s or less at a liquid temperature of 25° C.

<Foam-Molding of Polyurethane Foam>

The method of foam-molding the polyurethane foam employed may be a known foam-molding method, in which the polyurethane foaming liquid is injected into a cavity formed in a mold for foam-molding, and timed pressure release (TPR) is preferably employed in combination.

In TPR in the present invention, the pressure in the mold is reduced, thereby connecting the bubbles. More specifically, such steps may be performed that the foaming liquid is fed into the cavity formed in the mold, and then after a lapse of from 20 to 50 seconds from a gel time, the pressure in the mold is reduced by from 0.15 to 0.25 MPa.

The gel time referred herein means the time when the gel strength is generated by increasing the viscosity after mixing the polyol and the isocyanate.

For preventing the components of the polyurethane foaming liquid from being separated, it is preferred that the polyurethane foaming liquid is prepared by mixing the components immediately before injecting the polyurethane foaming liquid into the cavity of the mold. At this time, the liquid temperature of the foaming liquid is generally preferably from 10 to 50° C., more preferably from 20 to 40° C., and further preferably from 25 to 35° C. The order of mixing the components is not particularly limited, and for preventing unnecessary increase of the viscosity from occurring before preparing the polyurethane foaming liquid, it is preferred that at least the polyol as the component (A) is mixed finally with the isocyanate as the component (B). Subsequently, the foaming liquid immediately after the preparation thereof is injected under the atmospheric pressure to the cavity of the mold, in which the cavity can be depressurized, and then immediately after completing the injection, the depressurization is started. Thereafter, foaming and curing are performed in the mold, and the product of the present invention is obtained by releasing from the mold. The temperature of the mold is generally preferably from 40 to 80° C., more preferably from 50 to 70° C., and further preferably from 60 to 65° C.

<Properties of Urethane Foam>.

The urethane foam of the present invention preferably has, as the properties thereof, a resonance frequency of 4 Hz or less, which is preferably as small as possible, from the standpoint of suppressing car sickness and improving the ride comfort. When the resonance frequency exceeds 4 Hz, the transfer rate (magnification) at 6 Hz, which influences car sickness, may be increased, which may bring about danger of car sickness. The resonance magnification is generally 3 or less, which is preferably as small as possible. When the resonance magnification exceeds 3, the vertical shaking of a human body on sitting on the seat may be increased, which may bring about deterioration of the ride comfort. The hysteresis loss is generally 25% or less, preferably 22% or less, and more preferably 18% or less, from the standpoint of maintaining the elastic performance of the urethane foam, and when the hysteresis loss is large, such foam may be obtained that restoration after deformation is delayed.

The urethane foam of the present invention can suppress the shakiness, and on using as a vehicle seat pad, can suppress leaning of the seat on driving a curve.

Example

The present invention will be described in more detail with reference to examples below, but the present invention is not limited to the examples.

Evaluation Methods

Urethane foam produced in Examples and Comparative Examples was evaluated in the following manners.

(1) Resonance Frequency (Hz) and Resonance Magnification

The measurement was performed according to JASO B407. A specimen of the urethane foam having been adjusted to have a 25% hardness of 226 N (23 kgf) was used in the measurement. A pressure plate of 402 N (41 kg) was placed on the specimen, and vibrated at a frequency of from 1 to 10 Hz. The frequency, at which the maximum transfer rate was exhibited, was designated as the resonance frequency (Hz), and the transfer rate at the resonance frequency was designated as the resonance magnification. The 25% hardness herein means a load that is required for compressing the urethane foam by 25%.

(2) Stress Relaxation

The urethane foam was compressed to 75% of the initial thickness at a velocity of 50 mm/min with a circular pressure plate having a diameter of 200 mm. Thereafter, the load was removed, and the urethane foam was allowed to stand for 1 minute. The urethane foam was again applied with the load at the same velocity, and at the time when the load was 196 N (20 kgf), the pressure plate was stopped, and after allowing to stand for 5 minutes, the load was read out. The stress relaxation was calculated according to the following expression.

$$\text{stress relaxation (\%)} = 100 \times ((\text{load at stop of pressure plate (196 N)}) - (\text{load after allowing to stand for 5 minutes})) / (\text{load at stop of pressure plate (196 N)})$$

(3) Shaking Angle

FIG. 1 is a schematic illustration showing an apparatus for measuring the shaking angle. A jig 3 having an angle meter 2 attached thereto was placed on a specimen of the seat pad 1, and the leaning of the jig 3 on applying a horizontal force of from 0 to 59 N to the jig was measured with the angle meter 2.

Examples 1 and 2 and Comparative Examples 1 to 3

Foaming liquids were prepared according to the formulations shown in Table 1. On the preparation, a polyol mixture containing all the components except for the polyisocyanate component (B) was prepared, and then the polyisocyanate component (B) was mixed therewith. The polyol mixture was prepared in such a manner that the polyol component (A) and the catalyst (D) were mixed, then the foam stabilizer and the crosslinking agent were mixed therewith, and finally water was mixed therewith. On the preparation, the liquid temperature of the polyurethane foaming liquid was 30° C. Subsequently, the foaming liquid immediately after the preparation was injected under the atmospheric pressure to a cavity of a mold, in which the cavity can be depressurized, set at a temperature of 60° C., and then immediately after completing the injection, the depressurization was started. Thereafter, foaming and curing were performed in the mold, and after a lapse of 30 seconds from a gel time, the pressure in the mold was reduced by 0.2 MPa. Thereafter, polyurethane foam for a seat pad was obtained by releasing from the mold. The resulting polyurethane foam was evaluated in the aforementioned manners. The evaluation results are shown in Table 1.

It is understood from Table 1 that as comparing Example 1 to Comparative Examples 1 to 3, Comparative Example 1 is equivalent in the stress relaxation to Example 1 but is larger in the shakiness than Example 1, Comparative Example 2 is equivalent in the shakiness to Example 1 but is larger in the stress relaxation than Example 1, and Comparative Example 3 is slightly better in the stress relaxation than Example 1 but is significantly inferior in the shakiness to Example 1.

INDUSTRIAL APPLICABILITY

The polyurethane foam of the present invention achieves both reduced shakiness and reduced stress relaxation, prevents the seat pad from being shaken on driving a curve, suppresses the human body from leaning on application of centrifugal acceleration on driving a curve, and thus is suitable as a vehicle seat pad.

DESCRIPTION OF SYMBOLS

1 specimen of seat pad
2 angle meter
3 jig

The invention claimed is:
1. Polyurethane foam for a seat pad, comprising a foaming liquid containing (A) a polyol component, (B) a polyisocyanate component, (C) water and (D) a catalyst, which has been foam-molded,

TABLE 1

|  |  |  |  | Comparative Example | | | Example | |
|---|---|---|---|---|---|---|---|---|
|  |  |  |  | 1 | 2 | 3 | 1 | 2 |
| Composition of foaming liquid (part by mass) | (A) | Polyether polyol A [1] | | 50 | — | — | — | — |
|  |  | Polyether polyol B [2] | | — | 50 | — | — | — |
|  |  | Polyether polyol C [3] | | — | — | 50 | 45 | 40 |
|  |  | Polyether polyol D [4] | | — | — | — | 5 | 10 |
|  |  | Polymer polyol [5] | | 47 | 47 | 47 | 47 | 47 |
|  | (F) | Crosslinking agent [6] | | 3 | 3 | 3 | 3 | 3 |
|  | (D) | Catalyst [7] | | 0.3 | 0.3 | 0.3 | 0.3 | 0.3 |
|  | (E) | Silicone foam stabilizer [8] | | 0.7 | 0.7 | 0.7 | 0.7 | 0.7 |
|  | (C) | Water | | 2.4 | 2.4 | 2.4 | 2.4 | 2.4 |
|  | (B) | Polyisocyanate [9] | TDI/MDI (mass ratio) | 80/20 | 80/20 | 80/20 | 80/20 | 80/20 |
|  |  |  | Amount | 30.8 | 30.8 | 30.6 | 31.4 | 32.1 |
| Properties of polyurethane foam | | Resonance frequency (Hz) | | 3.8 | 3.8 | 3.6 | 3.7 | 3.8 |
|  |  | Resonance magnification | | 2.8 | 2.7 | 3.9 | 2.9 | 2.7 |
|  |  | Stress relaxation (%) | | 11.1 | 14.5 | 9.6 | 10.8 | 11.8 |
|  |  | Shaking angle | Force (N) 0 | 0.0 | 0.0 | 0.0 | 0.0 | 0.0 |
|  |  |  | 9.8 | 1.7 | 1.3 | 2.0 | 1.5 | 1.2 |
|  |  |  | 19.6 | 4.2 | 3.1 | 5.3 | 3.6 | 3.3 |
|  |  |  | 29.4 | 6.8 | 5.1 | 7.4 | 5.9 | 5.3 |
|  |  |  | 39.2 | 9.7 | 7.4 | 10.6 | 7.9 | 7.4 |
|  |  |  | 49.0 | 13.3 | 10.3 | 14.9 | 11.0 | 10.4 |
|  |  |  | 58.8 | 20.3 | 15.1 | 22.9 | 16.6 | 15.1 |

Note
[1] Polyether polyol A: EO/PO molar ratio: 16/84, number average molecular weight: 5,000, number of functional groups: 3
[2] Polyether polyol B: EO/PO molar ratio: 13/87, number average molecular weight: 3,000, number of functional groups: 3
[3] Polyether polyol C: EO/PO molar ratio: 13/87, number average molecular weight: 7,500, number of functional groups: 3
[4] Polyether polyol D: EO/PO molar ratio: 0/100, number average molecular weight: 700, number of functional groups: 3
[5] Polymer polyol: EO/PO molar ratio: 15/85, number average molecular weight: 5,000, number of functional groups: 3
[6] Crosslinking agent: polyether polyol (EO/PO molar ratio: 100/0, number average molecular weight: 400, number of functional group: 4)
[7] Catalyst: triethylenediamine (produced by Tosoh Corporation)
[8] Silicone foam stabilizer (SZ1325, a trade name, produced by Toray Dow Corning Co., Ltd.)
[9] Polyisocyanate: mixed to make TDI/MDI (mass ratio) of 80/20 and (NCO group)/(active hydrogen group in foaming liquid) (molar ratio) of from 95/15 to 100/0 (TDI: Cosmonate (registered trademark) T-80, produced by Mitsui Chemicals, Inc., MDI: MR-200HR, produced by Nippon Polyurethane Industry Co., Ltd.)

wherein the polyol component (A) contains from 40 to 55% by mass, based on the polyol component, of (a-1) a polyether polyol, which is obtained through ring-opening polymerization of ethylene oxide and propylene oxide, having a molar ratio of repeating units derived from ethylene oxide and propylene oxide of from 5/95 to 25/75 and a number average molecular weight of from 6,000 to 8,000, and containing from 5 to 15% by mass, based on the polyol component, of (a-2) a polyether polyol, which is obtained through ring-opening polymerization of propylene oxide solely or ethylene oxide and propylene oxide, having a molar ratio of repeating units derived from ethylene oxide and propylene oxide of from 0/100 to 5/95 and a number average molecular weight of from 600 to 2,000, wherein the number of hydroxyl groups contained in one molecule of each of components (a-1) and (a-2) is from 2 to 4, and an amount of water (C) contained is 2.0 parts by mass or more per 100 parts by mass of the polyol component (A).

2. The polyurethane foam for a seat pad according to claim 1, wherein the polyisocyanate component (B) contains tolylene diisocyanate and/or diphenylmethane diisocyanate.

3. The polyurethane foam for a seat pad according to claim 1, wherein the foaming liquid contains the polyisocyanate component (B) to make a molar ratio of an isocyanate group in the polyisocyanate component and an active hydrogen group in the foaming liquid of from 60/100 to 120/100.

4. The polyurethane foam for a seat pad according to claim 1, which further comprises (E) a foam stabilizer and/or (F) a crosslinking agent.

5. The polyurethane foam for a seat pad according to claim 1, which is obtained through foam molding containing the steps of: feeding the foaming liquid into a cavity formed in a mold; and after a lapse of from 20 to 50 seconds from a gel time, reducing a pressure in the mold by from 0.15 to 0.25 MPa.

6. The polyurethane foam for a seat pad according to claim 1, wherein the molar ratio of repeating units derived from ethylene oxide and propylene oxide of the component (a-1) is from 10/90 to 20/80.

* * * * *